United States Patent Office 2,925,313
Patented Feb. 16, 1960

2,925,313

SILOXANE AZO DYESTUFFS

Donald L. Bailey, Snyder, and Ronald M. Pike, Grand Island, N.Y., assignors to Union Carbide Corporation, a corporation of New York No Drawing. Application April 29, 1957
Serial No. 655,508

18 Claims. (Cl. 8—8)

This invention relates to silicon-containing dyestuffs as new compositions of matter and to processes for producing them. More particularly this invention is concerned with polysiloxane azo dyestuffs.

The siloxane azo dyestuffs of the present invention contain the unit represented by the following general formula:

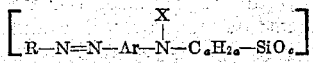

wherein R represents an aryl radical or a substituted aryl radical, as, for example, phenyl or naphthyl radicals or substituted phenyl or naphthyl radicals such as chlorine-, hydroxy-, methoxy-, lower alkyl-, methyl-, sulfo-, sulfonamide, unsubstituted arylazo-, substituted arylazo-, phenyl-, nitro- and acylamino-substituted phenyl or naphthyl radicals, and the like; Ar represents an arylene radical such as phenylene and naphthylene radicals and including substituted phenylene or naphthylene radicals; X represents a hydrogen atom or an alkyl radical; (c) has a value of 0.5, 1 or 1.5; and (a) is an integer having a value of at least 3, and preferably of from about 3 to about 5. The substituents on the Ar group can be lower alkyl radicals; alkoxy radicals, nitro radicals, halogen atoms, sulfo radicals, and the like.

The novel siloxane azo dyestuffs herein disclosed and claimed contain the unit represented by the following general formula:

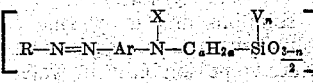

wherein R, Ar, X and (a) have the same meanings as hereinbefore indicated; V represents an alkyl radical such as methyl, ethyl, propyl, and the like, or an aryl radical such as phenyl; and (n) is an integer having a value of from 0 to 2.

The valuable dyestuffs of this invention can be produced by diazotizing a primary aromatic amine by methods known in dyestuff technology, as for example, by the addition of sodium nitrite solution to a chilled mixture of the primary aromatic amine in dilute aqueous hydrochloric acid to prepare a diazonium salt, and then reacting the produced diazonium salt with a functional arylaminoalkylsilane which can be represented by the general formula:

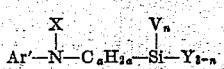

wherein X, V, (a) and (n) have the same meanings as hereinbefore indicated; Ar' represents an aryl radical or a substituted aryl radical, as, for example, phenyl or naphthyl radicals, or substituted phenyl or naphthyl radicals containing substituents on the aryl ring such as a lower alkyl-, alkoxy-, nitro-, halogen-, or sulfo-radicals; and Y represents an alkoxy radical or an aryloxy radical; and wherein the position para to the amino nitrogen atom is open and reactive. The functional arylamino- alkylsilanes suitable as coupling components in this invention, and processes for their production, are the subject matter of our copending patent application, Serial No. 615,463, filed October 12, 1956.

These functional arylaminoalkylsilanes can be produced by reacting an arylamine with an haloalkylsilane or an aminoalkylsilane as represented by the following general equation:

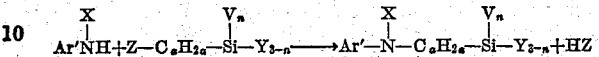

wherein Ar', X, V, Y, (a) and (n) have the same meanings as hereinbefore indicated; and Z represents a halogen atom or an amino radical. For example, the reaction of gamma-chloropropyltriethoxysilane with N-methyl aniline at about 150° C. under an inert gas atmosphere produced N-methyl N-(gamma-triethoxysilylpropyl)-aniline.

The production of the siloxane azo dyestuffs of this invention can be illustrated by the following general equation:

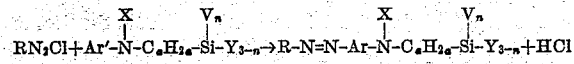

wherein R, Ar', Ar, X, V, Y, (a) and (n) have the same meanings as hereinbefore indicated.

Illustrative of the functional arylaminoalkylsilanes that can be used as coupling components in this invention are inter alia:

N-(gamma-triethoxysilylpropyl)-aniline,
N-methyl-N-(gamma-triethoxysilylpropyl)-aniline,
N,N-di-(gamma-triethoxysilylpropyl)-aniline,
N-(gamma-triethoxysilylpropyl)-1-naphthylamine,
N-(gamma-triethoxysilylpropyl)-2-methoxyaniline,
N-(gamma-triethoxysilylpropyl)-2,5-dichloroaniline,
N-(gamma-triethoxysilylpropyl)-3-nitroaniline,
N - (gamma-triethoxysilylpropyl)-1-naphthylamine-6-sulfonic acid,
N-(gamma-methyldiethoxysilylpropyl)-aniline,
N-(gamma-phenylmethylethoxysilylpropyl) - 2 - methylaniline,
N-(gamma-phenoxydiethoxysilylpropyl)-aniline, and the like.

The amino compounds suitable for use as starting materials in the production of the diazonium salts which can be used in this invention are the substituted and unsubstituted primary aryl amines which can be diazotized by procedures well known in the art. Illustrative are the primary monoamines of the benzene, naphthalene, or anthraquinone series; the monoamines of the aminoazo dyestuffs; or the diamines of the benzene, naphthalene, or biphenylene series. The substituents on the primary amine may be alkyl, alkoxy, aryl, aryloxy, aralkyl, alkylsilyl ($-C_aH_{2a}Si\equiv$), halogen, hydroxyl, sulfamido, nitro carboxyl, acylamino, arylazo, sulfo, and like radicals. In producing dyestuffs with tetrazonium salts obtained from diamines, for example from the tetrazos obtained from benzidine, dianisidine, 4,4'-diaminostilbene-2,2'-disulfonic acid, 4,4'-diaminostilbene or 4,4'-diaminobenzanilide, it is possible to couple both diazonium groups with two moles of an arylaminoalkylsilane, or to couple one diazonium group of the tetrazo with one mole of an arylaminoalkylsilane and the other diazonium group with a second mole of a conventional silicon-free coupling component.

Illustrative of the amino compounds which can be used in the preparation of diazonium salts suitable for use in this invention may be mentioned:

Aminobenzene,
1-aminobenzene-3-sulfonic acid,
1-aminobenzene-4-sulfonic acid, 1-aminobenzene-2-carboxylic acid,
1-aminobenzene-3-carboxylic acid,
1-aminobenzene-4-carboxylic acid,
1-amino-2-methylbenzene,
1-amino-3-methylbenzene,
1-amino-4-methylbenzene,
1-amino-4-phenylbenzene,
1-amino-2,4-dimethylbenzene,
1-amino-2,5-dimethylbenzene,
1-amino-4-nitrobenzene,
1-amino-2-chlorobenzene,
1-amino-4-chlorobenzene,
1-amino-2,5-dichlorobenzene,
1-amino-2,5-dichlorobenzene-4-sulfonic acid,
1,4-diaminobenzene-3-sulfonic acid,
1,4-diaminobenzene-3-carboxylic acid,
4-acetylamino-1-aminobenzene,
4-carbethoxyamino-1-aminobenzene,
4-benzoylamino-1-aminobenzene,
4-amino-1,1'-azobenzene,
4,4'-diamino-1,1'-azobenzene,
4-amino-4'-hydroxy-1,1'-azobenzene-3'-carboxylic acid,
4 - amino - 4' - hydroxy - 1,1' - azobenzene - 3' - carboxy-5'-sulfonic acid,
1-amino-4-hydroxybenzene-3-carboxylic acid,
1-amino-4-hydroxybenzene-3-carboxylic acid-5-sulfonic acid,
4,4'-diaminodiphenyl,
3,3'-dimethyl-4,4'-diaminodiphenyl,
3,3'-dimethoxy-4,4'-diaminodiphenyl,
3,3'-dichloro-4,4'-diaminodiphenyl,
4,4'-diaminodiphenyl-3-sulfonic acid,
4,4'-diaminodiphenyl-3,3'-disulfonic acid,
4,4'-diaminodiphenyl-3,3'-dicarboxylic acid,
1-amino-4(4'-amino-benzoylamino)-benzene,
4,4'-diaminodiphenylurea,
4,4'-diaminostilbene-2,2'-disulfonic acid,
4,4'-diaminodiphenylamine,
4,4'-diaminodiphenylmethane,
4,4'-diaminodiphenylsulfone,
1-(4'-aminophenyl)-3-methyl-5-pyrazolone,
1-(3'-aminophenyl)-3-methyl-5-pyrazolone,
2-aminonaphthalene,
1-aminonaphthalene-5-sulfonic acid,
1-aminonaphthalene-7-sulfonic acid,
2-aminonaphthalene-6-sulfonic acid,
2-aminonaphthalene-3,6-disulfonic acid,
2-aminonaphthalene-4,8-disulfonic acid,
2-aminonaphthalene-5,7-disulfonic acid,
2-aminonaphthalene-6,8-disulfonic acid,
1-aminonaphthalene-3,6-disulfonic acid,
1-aminonaphthalene-3,8-disulfonic acid,
1-amino-8-hydroxynaphthalene-4-sulfonic acid,
2-amino-5-hydroxynaphthalene-7-sulfonic acid,
2-amino-8-hydroxynaphthalene-6-sulfonic acid,
1-amino-8-hydroxynaphthalene-6-sulfonic acid,
1-amino-8-hydroxynaphthalene-2,4-disulfonic acid,
1-amino-8-hydroxynaphthalene-3,6-sulfonic acid,
2-amino-8-hydroxynaphthalene-3,6-disulfonic acid,
2-amino-1-carboxybenzene-4-sulfonic acid,
2-amino-1-carboxybenzene-5-sulfamide,
1-amino-8-phenylsulfitonaphthalene-3,6-disulfonic acid,
1-amino-2-hydroxy-4-nitrobenzene,
2-(2'-methyl-4'-aminophenylazo)-naphthalene-6,8 - disulfonic acid,
gamma-4-aminophenylpropyltrimethylsilane, and the like.

This enumeration illustrates the wide variety of diazotizable aromatic primary amines which can be used and we do not intend this list to be limitative thereof. The shades of the dyestuffs obtained vary from yellows to oranges, blues, greys and browns; and the color of the dyestuff produced varies according to the particular components selected, as is well known in dyestuff technology.

The new dyestuffs are made by methods known to be suitable for the manufacture of dyestuffs. For example, the primary aromatic amine is diazotized and the diazonium salt is then slowly added to a cooled mixture of the arylaminoalkylsilane to produce the dyestuff; or the arylaminoalkylsilane may be added to the diazonium salt. In all instances coupling will occur in the position para to the amino nitrogen atom of the arylaminoalkylsilane; and when the coupling is carried out in the presence of water, hydrolysis occurs and siloxanes are formed.

When the coupling reaction is carried out under substantially anhydrous conditions, for example, in the presence of organic solvents such as dioxane, glacial acetic acid, dimethyl-formamide, ethylene glycol, and the like, there is produced a functional silane dyestuff. This dyestuff may then be hydrolyzed to produce the polysiloxane dyestuffs of this invention. Thus, the functional silane dyestuff represented by the structural formula:

was produced by diazotizing p-nitroaniline under anhydrous conditions and then coupling with N-methyl-N-(gamma-triethoxysilylpropyl)-aniline in glacial acetic acid medium. The functional dyestuff can then be hydrolyzed by adding it to water and, if necessary, heating. The polysiloxane dyestuff so produced contains units which can be represented by the structural formula:

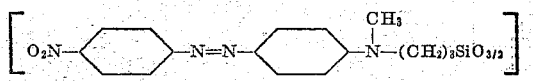

The monomeric functional silane dyestuffs and processes for their production are the subject matter of a copending application.

The polysiloxane dyestuffs of this invention are substantive to natural fibers such as silk, wool and cotton; and also to the synthetic fibers such as nylon, Dynel, Acrilan, acetate and viscose. In addition the dyestuffs of this invention are characterized by the very useful property of being capable of dyeing glass cloth and silica from an aqueous dyebath solution. These dyeings have good wash fastness and other properties. It has been found that these polysiloxane dyestuffs impart some water-repellancy to the natural fibers dyed therewith.

The dyestuffs of this invention are soluble in weakly basic mixtures of water and organic solvents such as alcohols, dioxane, dimethyl-formamide and pyridine; in aqueous acid solutions and in organic solvents. The presence of solubilizing radicals, such as sulfo or carboxy radicals, provides some solubility in water alone. Dyeing can be carried out either from solution, or from suspension, at temperatures above about 30° C., preferably at the boiling point of the dyebath.

The polysiloxane dyestuffs of this invention contain the unit represented by the general formula:

when a trifunctional arylaminoalkylsilane is employed as coupling component; and the unit represented by the formula:

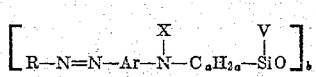

wherein (b) has a value of at least 3 and may be as high as 7 for cyclic polysiloxanes and higher for linear polysiloxanes, when a difunctional arylaminoalkyl silane is employed as coupling component; while the disiloxane

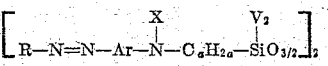

is obtained when the coupling component is a monofunctional arylaminoalkylene silane. It is also possible to obtain polysiloxane dyestuffs wherein only some of the hydrolyzable groups have reacted; for example, dyestuffs containing units represented by the general formula:

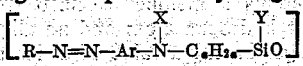

The metal complexes of the polysiloxane dyestuffs of this invention can also be produced. For example, the first diazo group of dianisidine tetrazo can be coupled with one mole of an arylaminoalkylsilane and then the second diazo group can be coupled with 1-hydroxy-8-acetylaminonaphthalene-3,6-disulfonic acid and the dyestuff so obtained can then be metallized by procedures well known in the dyestuff industry. Metallized dyes can also be obtained by coupling a diazonium salt having a metallizable group ortho to the diazonium group with an arylaminoalkylsilane which has a metallizable group ortho to the azo linkage which is formed and then metallizing the dye so obtained with a salt of Cr, Mr, Fe, Co, Ni, Cu, Cd, Pb, Sn, Zn, and the like.

The invention is further illustrated by the appended examples:

EXAMPLE 1

Aniline (9.3 g.) was diazotized in the usual manner. To this aqueous diazo solution there was slowly added 30.7 g. of N-methyl-N-(gamma-triethoxysilylpropyl)-aniline at 0° to 5° C. while stirring. The coupling was stirred overnight at about 5° C. and then allowed to come to room temperature. The deep red silicon containing dye which had separated out was isolated and dried at 65° C. in a vacuum oven. Yield was 10.6 g.; the polysiloxane dyestuff, which can be represented by the formula:

was insoluble in distilled water and slightly soluble in methanol and ethanol.

EXAMPLE 2

Anthranilic acid (9.06 g.) was diazotized in the usual manner. To this aqueous diazo there was slowly added 15.4 g. of N-methyl-N-(gamma-triethoxysilylpropyl)-aniline at about 5° C. with stirring. The coupling was stirred 1½ hours at 0° to 5° C. and then a solution of 2.05 g. of sodium acetate in 12.5 ml. of water was added. Stirred the mixture overnight at 0° to 5° C. and then added another similar portion of sodium acetate solution and let the reaction mixture come to room temperature slowly. Neutralized to pH of about 7 with dilute sodium hydroxide, as indicated on Universal Indicator paper. The deep red silicon containing polymeric dyestuff, which can be represented by the formula:

was isolated and dried at 65° C. in a vacuum oven. Yield was 14.3 g.

EXAMPLE 3

Diazotized 1.37 g. of p-aminobenzoic acid in the usual manner at 0° C. Then, while stirring, slowly added 3.11 g. of N-methyl-N-(gamma-triethoxysilylpropyl)-aniline at about 0° to 5° C. and continued stirring for an additional 1½ hours after addition was complete. At 0° C. added 10% potassium hydroxide solution to a pH of about 7 as indicated on Universal indicator paper and stirred for another six hours at 0° C. Let stand at room temperature and then filtered to recover the red polymeric silicon containing dyestuff, which can be represented by the formula:

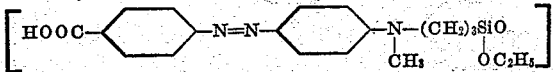

Dried in a vacuum oven at 65° C. Yield was 3.6 g.

EXAMPLE 4

Diazotized 4.7 g. of sulfanilic acid in the usual manner. To this diazo at 0° to 5° C. there was added a solution of 7.7 g. of N-methyl-N-(gamma-triethoxysilylpropyl)-aniline in 5 ml. of ice and 3.5 ml. of 20° Baumé hydrochloric acid. A red polymeric dyestuff, which can be represented by the formula:

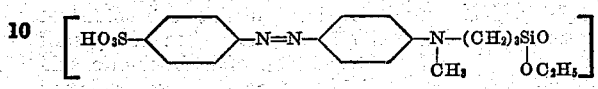

formed immediately. Added a solution of 5 g. of sodium hydroxide in 12.5 ml. of water at 0° C. and after ½ hour the red polysiloxane dyestuff was filtered off. The dyestuff was dissolved in 50 ml. of a methanol by the slow addition of hydrochloric acid and the solution was filtered to remove insoluble impurities. Added a 10% solution of sodium hydroxide to precipitate the polymeric siloxane dyestuff. The recrystallization was repeated once again and the dyestuff was then dried in a vacuum oven at 65° C. for 1 hour. Yield of purified product was 2.7 g.

EXAMPLE 5

Diazotized 7.6 g. of 2-aminonaphthalene-6,8-disulfonic acid in the usual manner. This was coupled with 7.7 g. of N-methyl-N-(gamma-triethoxysilylpropyl)-aniline in the same manner as described in Example 4. After isolation the bluish-red polymeric dyestuff, which can be represented by the formula:

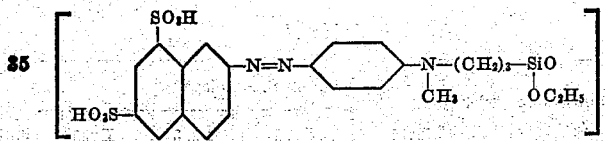

was dissolved in a small amount of 5% sodium hydroxide solution and filtered to remove insolubles. The filtrate was neutralized with dilute hydrochloric acid to precipitate the dyestuff, which was filtered off and washed on the funnel first with water and then with methanol. Dried in a vacuum oven at 100° C. for 5 hours. Yield was 14.2 g.

EXAMPLE 6

Diazotized 3.52 g. of 1-amino-8-hydroxynaphthalene-3,6-disulfonic acid (H acid) in the usual manner. This was coupled with 3 g. of N-methyl-N-(gamma-triethoxysilylpropyl)-aniline in the same manner as described in Example 4. After isolation the purple colored solid polymeric siloxane dyestuff, which can be represented by the formula:

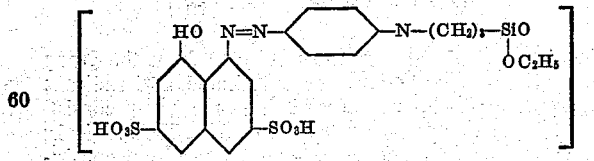

was dissolved in 100 ml. of 5% potassium hydroxide and the solution was filtered to remove insolubles. Reprecipitated by acidification of the filtrate with 20° Baumé hydrochloric acid. The precipitated siloxane dyestuff was filtered and dried in a vacuum oven at 55° C. for 7 hours. The blue-black power weighed 1.2 g.

EXAMPLE 7

Diazotized 4.29 g. trisodium 1-aminonaphthalene-3,6,8-trisulfonate in the usual manner. This was coupled with 3 g. of N-methyl-N-(gamma-triethoxysilylpropyl)-aniline as described in Example 4. The yield of dry red-solid polysiloxane dyestuff, which can be represented by the formula:

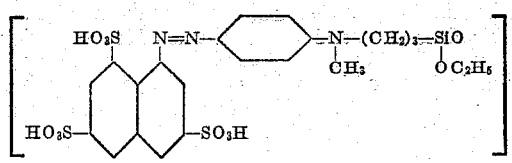

was 2.3 g. This was dissolved in 100 ml. of 5% potassium hydroxide solution and filtered. The siloxane dyestuff was reprecipitated by the addition of hydrochloric acid to a pH of about 7 as indicated on Universal indicator paper. After drying in a vacuum oven at 55° C. for about 8 hours the purified polymeric siloxane dyestuff weighed 1.5 g.

EXAMPLE 8

One gram of the dyestuff according to Example 1 was dissolved in 75 ml. of water, 25 ml. of ethanol, 0.4 ml. of a 5% sodium hydroxide solution and 1 g. of vinyl triethoxysilane. Then immersed a 4 inch square piece of cotton cloth into the dyebath and heated to about 90° to 95° C. with frequent movement of the material. After about 5 minutes, the dyed cotton cloth was removed from the dyebath. Dye take-up was excellent. The yellow dyed cotton cloth was washed with water and then methanol and it was then air dried at room temperature and then at 125° C. for 20 minutes. It showed good wash fastness properties.

Dyeing was repeated, using the same technique, on different cloths and also with various other dyes. The results are tabulated in Table A.

Table A

| Substrate Dyed | Dyestuff Employed | | | |
|---|---|---|---|---|
| | Ex. 1 | Ex. 2 | Ex. 3 | Ex. 5 |
| Glass cloth | Yellow(E) | Yellow(E) | | Orange(E). |
| Gabardine cloth | | | | Pale yellow-orange(E). |
| Silk cloth | | | | Orange(E). |
| Cotton cloth | Yellow(E) | Yellow(E) | | Do. |
| Nylon cloth | | | | Do. |
| Orlon cloth | Yellow | | | Pale yellow-orange(E). |
| Dacron cloth | Pale yellow. | | | Do. |
| Wool cloth | | | | Orange(P). |
| Silica | Yellow | Yellow(E) | Yellow (E) | Orange(E). |

E indicates good to excellent dye take-up by the substrate.
P indicates poor dye take-up.

What is claimed is:

1. Polysiloxane azo dyestuffs containing units represented by the general formula:

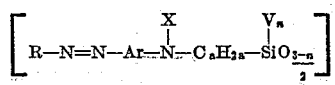

wherein R represents a member selected from the group consisting of aryl radicals and substituted aryl radicals; Ar represents a member selected from the group consisting of arylene radicals and substituted arylene radicals; X represents a member selected from the group consisting of a hydrogen atom and an alkyl radical; V represents a member selected from the group consisting of alkyl radicals and aryl radicals; $(n)$ is an integer having a value of from 0 to 2, and $(a)$ is an integer having a value of at least 3.

2. Polysiloxane azo dyestuffs containing units represented by the general formula:

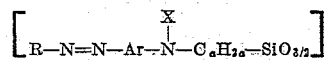

wherein R represents a member selected from the group consisting of aryl radicals and substituted aryl radicals; Ar represents a member selected from the group consisting of arylene radicals and substituted arylene radicals; X represents a member selected from the group consisting of a hydrogen atom and an alkyl radical; and $(a)$ is an integer having a value of at least 3.

3. Polysiloxane azo dyestuffs containing units represented by the general formula:

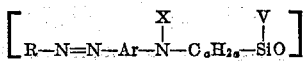

wherein R represents a member selected from the group consisting of aryl radicals and substituted aryl radicals; Ar represents a member selected from the group consisting of arylene radicals and substituted arylene radicals; X represents a member selected from the group consisting of a hydrogen atom and an alkyl radical; V represents a member selected from the group consisting of alkyl radicals and aryl radicals; and $(a)$ is an integer having a value of at least 3.

4. Disiloxane azo dyestuffs represented by the general formula:

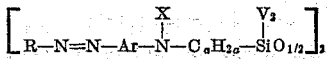

wherein R represents a member selected from the group consisting of aryl radicals and substituted aryl radicals; Ar represents a member selected from the group consisting of arylene radicals and substituted arylene radicals; X represents a member selected from the group consisting of a hydrogen atom and an alkyl radical; V represents a member selected from the group consisting of alkyl radicals and aryl radicals; and $(a)$ is in integer having a value of at least 3.

5. Dyestuffs containing units represented by the general formula:

6. Dyestuff containing units represented by the general formula:

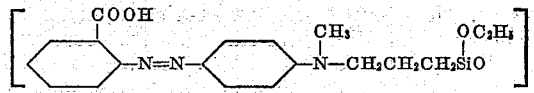

7. Dyestuffs containing units represented by the general formula:

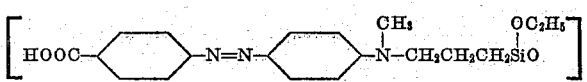

8. Dyestuffs containing units represented by the general formula:

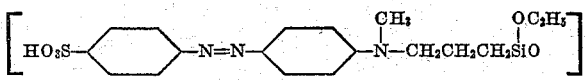

9. Dyestuffs containing units represented by the general formula:

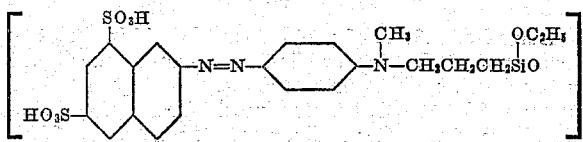

10. Dyestuffs containing units represented by the general formula:

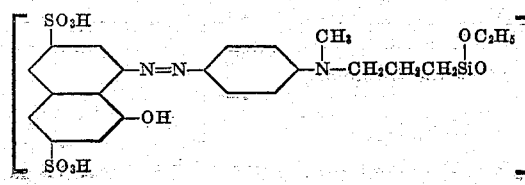

11. Dyestuffs containing units represented by the general formula:

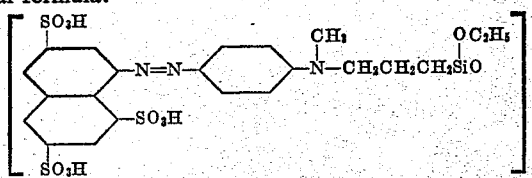

12. Dyestuffs containing units represented by the general formula:

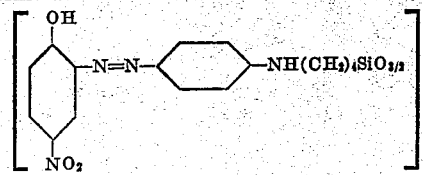

13. Dyestuffs containing units represented by the general formula:

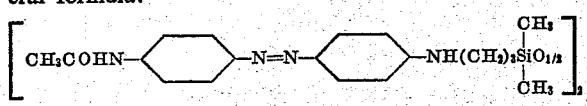

14. The method of dyeing fibrous material, which comprises exposing said fibrous material to a dye bath containing a siloxane azo dyestuff containing units which can be represented by the general formula:

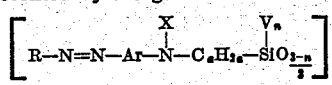

wherein R represents a member selected from the group consisting of aryl radicals and substituted aryl radicals; Ar represents a member selected from the group consisting of arylene radicals and substituted arylene radicals; X represents a member selected from the group consisting of a hydrogen atom and an alkyl radical; V represents a member selected from the group consisting of alkyl radicals and aryl radicals; ($n$) is in integer having a value of from 0 to 2, and ($a$) is an integer having a value of at least 3, at an elevated temperature, rinsing, and drying.

15. A fiber dyed with a siloxane azo dyestuff of claim 1.

16. Glass fiber dyed with a siloxane azo dyestuff of claim 1.

17. Process for producing siloxane azo dyestuffs which comprises the steps of producing a functional silane azo dyestuff under substantially anhydrous conditions and further comprising hydrolyzing said silane dyestuff in aqueous medium to produce said siloxane azo dyestuff.

18. Silica dyed with the polysiloxane azo dyestuffs of claim 1.

References Cited in the file of this patent

UNITED STATES PATENTS

| | | |
|---|---|---|
| 2,317,965 | Bestian | Apr. 27, 1943 |
| 2,715,133 | Speier | Aug. 9, 1955 |
| 2,762,823 | Speier | Dec. 17, 1956 |
| 2,778,746 | Steinman | Jan. 22, 1957 |
| 2,832,754 | Jex | Apr. 29, 1958 |
| 2,849,333 | Kingsbury | Aug. 26, 1958 |

UNITED STATES PATENT OFFICE

CERTIFICATE OF CORRECTION

Patent No. 2,925,313            February 16, 1960

Donald L. Bailey et al.

It is hereby certified that error appears in the printed specification of the above numbered patent requiring correction and that the said Letters Patent should read as corrected below.

Column 4, line 72, in the formula before the closing brackett, at the bottom, for "3/2" read -- 1/2 --.

Signed and sealed this 16th day of August 1960.

(SEAL)
Attest:

KARL H. AXLINE            ROBERT C. WATSON
Attesting Officer            Commissioner of Patents